US006972794B1

(12) United States Patent
Wang et al.

(10) Patent No.: US 6,972,794 B1
(45) Date of Patent: Dec. 6, 2005

(54) DUAL SENSITIVITY IMAGE SENSOR

(75) Inventors: Yibing Michelle Wang, La Jolla, CA (US); Sandor Barna, Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 1079 days.

(21) Appl. No.: 09/596,757

(22) Filed: Jun. 15, 2000

Related U.S. Application Data

(60) Provisional application No. 60/139,345, filed on Jun. 15, 1999.

(51) Int. Cl.[7] .............................................. H04N 3/14
(52) U.S. Cl. ..................................................... 348/302
(58) Field of Search .............................. 348/302, 308, 348/362

(56) References Cited

U.S. PATENT DOCUMENTS

| | | | |
|---|---|---|---|
| 5,471,515 A | * | 11/1995 | Fossum et al. ............... 377/60 |
| 5,483,091 A | * | 1/1996 | West et al. ................... 257/239 |
| 5,600,451 A | | 2/1997 | Maki |
| 5,714,753 A | * | 2/1998 | Park ........................ 250/208.1 |
| 5,737,016 A | | 4/1998 | Ohzu et al. |
| 5,886,343 A | | 3/1999 | Miyawaki et al. |
| 5,898,168 A | | 4/1999 | Gowda et al. |
| 5,907,357 A | | 5/1999 | Maki |
| 6,046,466 A | | 4/2000 | Ishida et al. |
| 6,078,037 A | * | 6/2000 | Booth, Jr. ................. 250/208.1 |
| 6,115,065 A | * | 9/2000 | Yadid-Pecht et al. ........ 348/308 |
| 6,665,013 B1 | * | 12/2003 | Fossum et al. .............. 348/308 |
| 6,710,804 B1 | * | 3/2004 | Guidash ...................... 348/302 |
| 6,724,426 B1 | * | 4/2004 | Berezin et al. .............. 348/308 |

OTHER PUBLICATIONS

Kirkish et al, Optical Characteristics of CMOS-Fabricated MOSFET's, Apr. 1987, IEEE Journal, No. 2, vol. SC-22, pp. 299-301.*

* cited by examiner

Primary Examiner—Wendy R. Garber
Assistant Examiner—Jacqueline Wilson
(74) Attorney, Agent, or Firm—Dickstein Shapiro Morin & Oshinsky LLP

(57) ABSTRACT

A system of taking images of different sensitivities at the same time uses both an image sensor, and an auxiliary part to the image sensor. The image sensor element can be a photogate, and the auxiliary part can be the floating diffusion associated with the photogate. Both the photogate and the floating diffusion accumulate charge. Both are sampled at different times. The floating diffusion provides a lower sensitivity amount of charge than the photogate itself. The system can have a photogate and floating diffusion in each pixel along with a select transistor, a reset transistor, and a follower transistor. All of this circuitry can be formed of CMOS for example. The system can also operate in a column/parallel mode, where each column of the photo sensor array can have a column signal processor which samples and holds the reset signal, the floating diffusion signal and the photogate signal.

28 Claims, 3 Drawing Sheets

Photogate structure and the readout circuit for two images of different sensitivities.

Fig 1: Photogate structure and the readout circuit for two images of different sensitivities.

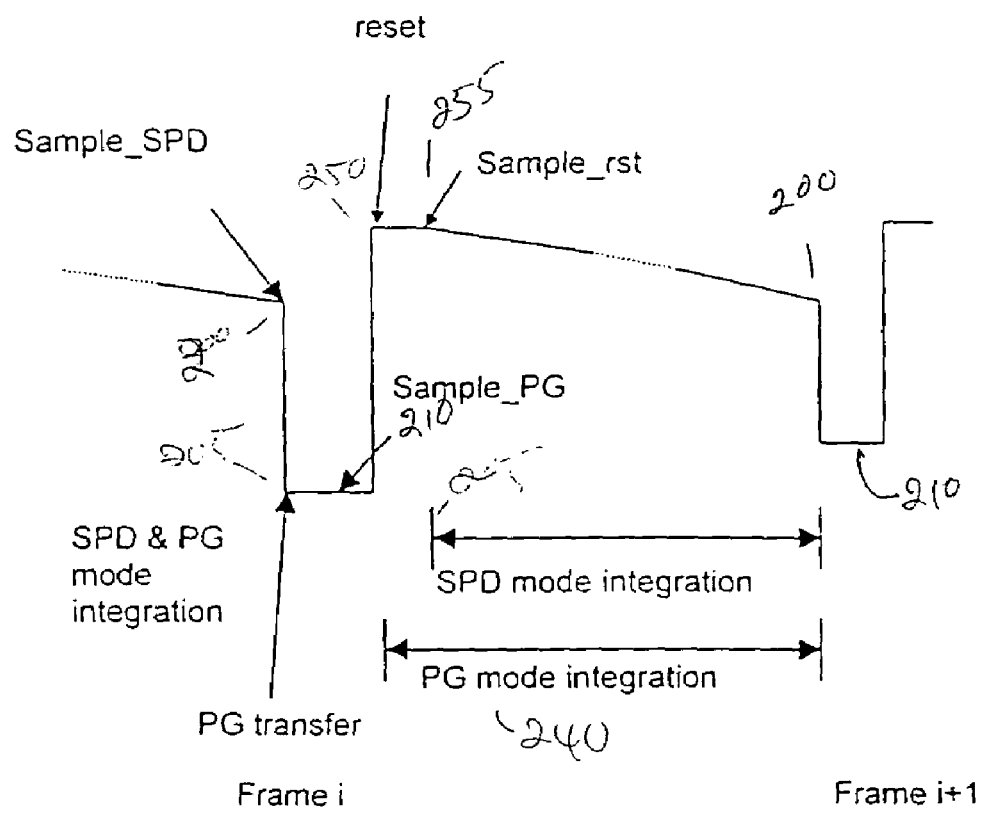
Fig 2: Voltage change of the floating diffusion and readout timing.

DUAL SENSITIVITY IMAGE SENSOR

This application claims priority from Provisional application No. 60/139,345, filed Jun. 15, 1999.

BACKGROUND

The dynamic range of a typical CMOS image sensor is between 65 and 75 dB. The scene dynamic range, however, may extend over more than 5 orders of magnitude. If the scene dynamic range exceeds the sensor dynamic range, then portions of the image may be clipped or distorted in the darkest or brightest areas of the scene.

Techniques for extending dynamic range have included using both non-linear sensors and linear sensors. The non-linear sensors may cause image lag, have a large pixel size, cause inflexible or destructive compression, loss of contrast, increased noise or long integration time. Linear sensors may have excellent contrast and improved noise processing. They may also produce excellent opportunities for post-processing, since the output is typically directly related to the input.

A high dynamic range linear sensor often takes several integrations of the same scene. Each integration has a different integration time. The varying sensitivity of the different integrations can provide more information about the scene. When each integration is completed, each pixel may be accessed several times to obtain all the information. This necessity to access the pixels may decrease the frame rate of the sensor. A frame memory may also be necessary to store the results of the integration temporarily.

SUMMARY

The present system uses obtains two integrations of the same image, at the same time, using a photoreceptor, and the auxiliary part for the photoreceptor.

An embodiment discloses using a photogate which has an associated floating diffusion used. Both the photogate and the floating diffusion simultaneously acquire information about the image. The photogate may be more efficient and produces a higher sensitivity value than the floating diffusion. In this way, both a high and a low sensitivity version of the image can be obtained. The information may have an increased dynamic range.

BRIEF DESCRIPTION OF THE DRAWINGS

These and other aspects will now be described in detail with reference to the accompanying drawings.

FIG. 2 shows a diagram illustrating the flow of operation.

DETAILED DESCRIPTION

The present application describes using a photoreceptor of a type that has an associated part that stores charge. The photoreceptor can include a photogate and the associated part can be a floating diffusion that stores charge from the photogate. This can facilitate obtaining two images of the same scene at the same time. The two images have different sensitivities. It is recognized by the present inventors that the photogate pixel actually has two electron collecting areas.

The photogate itself collects electrons. The floating diffusion area also collects electrons, but does so at a lower efficiency, as compared with the photogate.

Hence, during the integration period, the photogate area generates a higher sensitivity signal, and the floating diffusion generates a lower sensitivity signal. The lower sensitivity signal may have an integration time which is equal to or less than the integration time of the higher sensitivity signal. The lower sensitivity node is 30 to 40 times less sensitive than the high sensitivity node. This sensitivity, however, can vary depending on the ratio between photogate area and area of the floating diffusion. Different pixels can be designed with different ratios. These can be determined, for example, by trial and error.

Figure 1A:
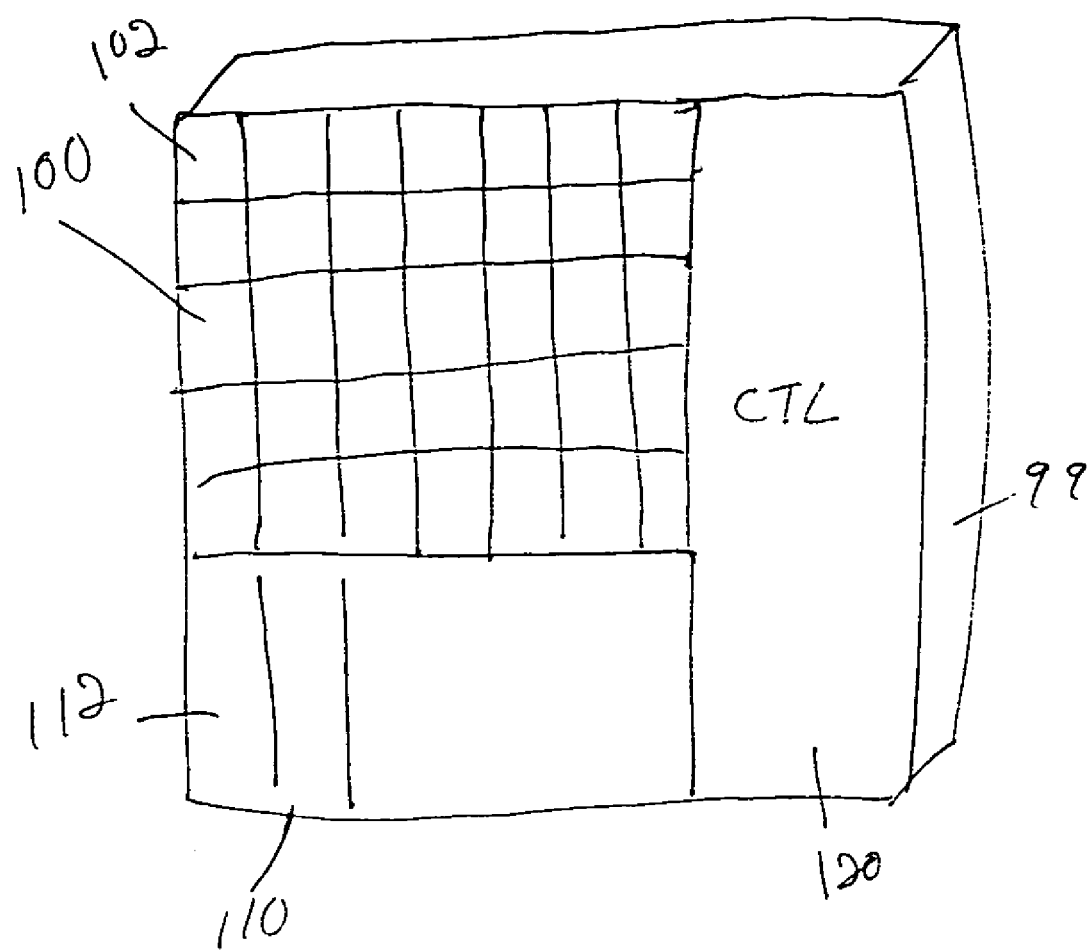
FIG. 1A shows the layout of a CMOS image sensor array including the image acquisition part and the signal processing part.

FIG. 1A shows an overall layout of the sensor chip. A single silicon substrate 99 has integrated therein a photosensor array 100 which includes a plurality of pixel photosensor elements arranged in rows and columns. Each of the pixels, such as 102, preferably has the same structure. The same substrate 99 also includes an image processor part 110, formed of a plurality of circuits 112. Each of the image processor circuits preferably has identical structure. Also integrated on the chip 99 is a controlling element 120, which produces control signals that control the flow of the operation on the chip.

Each of the transistors on the substrate are preferably formed of MOS type circuit elements. The control structure can be CMOS.

Figure 1B:
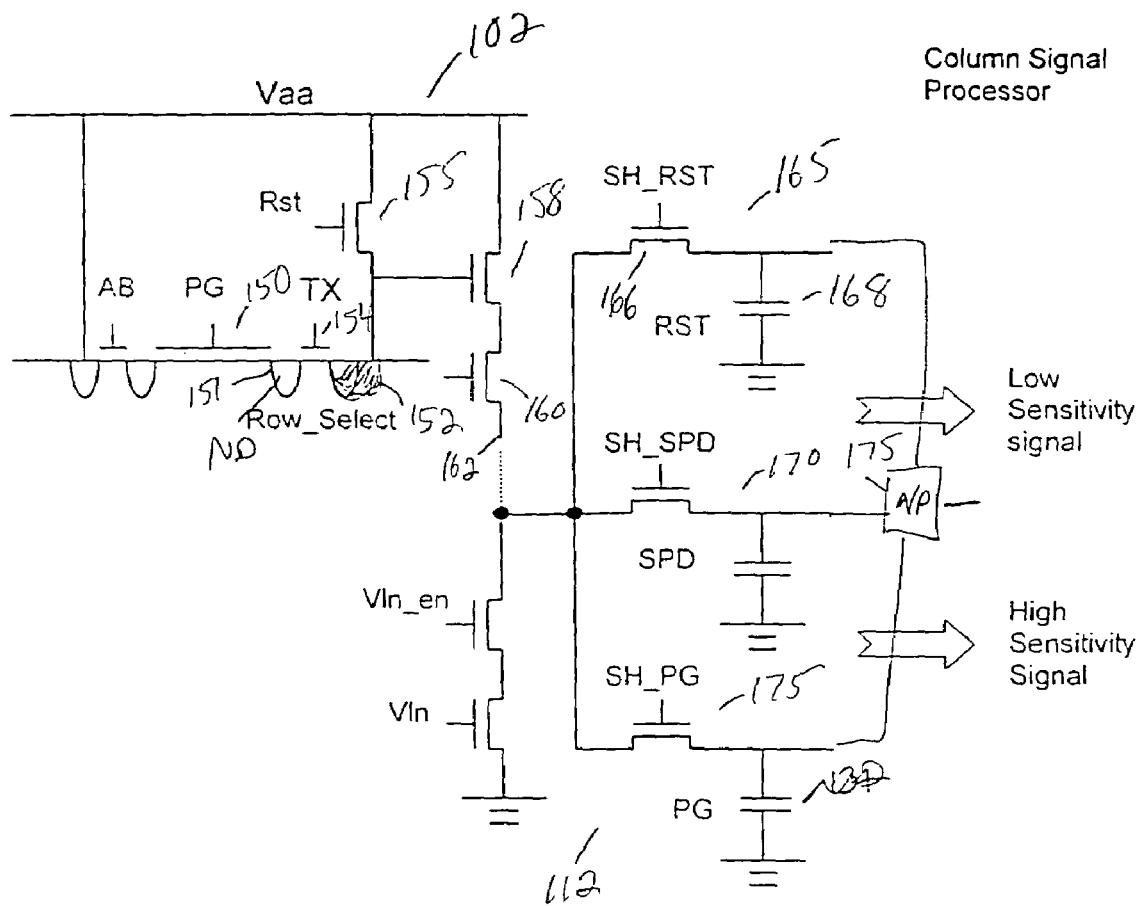
FIG. 1B shows a circuit diagram of a single pixel and a single part of the column signal processor.

FIG. 1B shows a detailed schematic of the structure of the pixels 102 and an associated processing circuit 112. The signals described herein are produced by the control circuit 120, which can be a small processor, or can be hardwired logic, which is created using hardware definition language. The system preferably uses a photosensor of a type which has an associated charge storage part. One recognition of the present application is that this associated charge storage part will also integrate charge from incoming light. However, the charge integration may be less efficient than the actual photoreceptor. In this embodiment, the photoreceptor is a photogate 150, which has an associated node 151. The node 151 is maintained separated from a floating diffusion 152. A transfer gate 154 seperates the charge stored in the photogate 150 from the floating diffusion 152. The TX gate is held at a fixed voltage of about 1.2 volts, which is a slightly "ON" state. This forms a barrier to the charge under the photogate, when the photogate is biased high, say at 5 volts. When the photogate is pulsed low, e.g., to 0 volts, the TX gate forms a channel, allowing the charge to pass to the floating diffusion. The control of the photogate voltage PG is produced by the control circuit 120.

The level of the floating diffusion can be adjusted by the reset transistor 155. The reset signal RXT connects the reset transistor to the voltage $V_{AA}$, which is a reset voltage. The level on floating diffusion 152 is also buffered by a follower 158, and can be sampled. A row select transistor 160 is actuated by the control circuit 120 to select that specified row of pixels. A plurality of other row select transistors from different rows are connected to the node 162. Only one row is preferably selected at any one time. Each column of pixels is associated with a column signal processor shown as 112. The column signal processor processes the signals described herein. As shown, three sample and hold circuits are provided. A first sample and hold circuit 165 stores the reset level. The SH_RST signal from the control circuit 120 turns on the transistor 166 thus storing the reset level into the capacitor 168. Analogously, the other sample and hold circuit 170 stores the floating diffusion level, and the third sample and hold circuit 175 stores the photogate signal. An arithmetic processor 175 can be provided to provide any desired combination of these signals.

The low sensitivity signal can correspond to the floating diffusion values subtracted from the reset value. The photogate value can correspond to the photogate sample and hold level, subtracted from the floating diffusion value, and optionally also subtracted from the reset value. Each of the pixels in a specific row receives the same row select signal to the base of the transistor 160 that is associated with each pixel in that row. This turns on all of the transistors in a row at once, thereby selecting the entire row at once. All transistors in all other rows are maintained off. One value from each column is thereby obtained at any time, into a corresponding signal processing unit 112. This allows the system to operate in a so-called column/parallel mode wherein an entire row of pixel outputs are obtained.

The operation occurs as shown in FIG. 2. During each cycle, the system is first reset as shown as 250, to a reset level. The reset value is sampled at 255. The reset value is sampled during this time by selecting the row, and actuating the SH_RST signal to provide the reset signal onto the associated capacitor 168. The photogate mode integration begins at the time of reset shown as 240. The floating diffusion integration begins at time 245, after the sample reset value is detected.

At the end of the integration time, the floating diffusion 152 has integrated charge. This is sampled at time 200, to obtain the value of the FD sample. This value is then actuated into the sample and hold circuit 170. The photogate also includes charge. After sampling the floating diffusion, the transfer gate 154 is actuated by producing the signal TX from the controller. This dumps the charge from the photogate 150 into the floating diffusion and the floating diffusion is again sampled at 210 to obtain the photogate value. This value is then held in the sample and hold 175.

Both the photogate and the floating diffusion integrate during the same time period. At least 80% of the integration time is preferably common. The time of integration of the FD may be slightly less, to accommodate sampling values on the floating diffusion. However, since the time of integration is mostly common, the same scene is imaged.

Although only a few embodiments have been disclosed in detail above, other embodiments are possible. For example, while the embodiment disclosed above describes using the photogate, it could also be done with other kinds of light sensing devices. An important feature is that two different levels of charge, at two different sensitivities, are sampled into different node at least partly simultaneously.

All such modifications are intended to be encompassed within the following claims.

What is claimed is:

1. An image sensor comprising:
   a plurality of image sensing pixel portions; and
   a plurality of image processing portions;
   each said image sensing pixel portion including a photoreceptor, which has a first sensitivity to light and produces charge based on an amount of incident light, and an associated portion for said photoreceptor, which associated portion selectively receives charge from said photoreceptor but which by itself has a second sensitivity to light different than said first sensitivity to light and produces charge based on an amount of incident light, an in-pixel follower transistor, and an in-pixel select transistor; and
   wherein each said image processing portion includes circuitry that produces an output indicative of both an amount of charge received by said associated portion, and an amount of charge received by said photoreceptor.

2. A sensor as in claim 1 wherein said photoreceptor is a photogate, and said associated portion is a floating diffusion associated with said photogate in each said pixel.

3. A sensor as in claim 2 further comprising a transfer gate, located between said photogate and said floating diffusion, which separates charge stored in said photogate from said floating diffusion.

4. A sensor as in claim 2 further comprising, in each said pixel, a reset transistor, connected between a reset level and said floating diffusion, and which operates to reset a value of said floating diffusion to a specified level.

5. A sensor as in claim 2 wherein each of said photogate, said floating diffusion, and said in-pixel transistors are formed of MOS-type technology.

6. A sensor as in claim 2 wherein said image processing portion includes a plurality of sample and hold circuits.

7. A sensor as in claim 6 wherein said plurality of sample and hold circuits include a first sample and hold circuit storing a reset level, a second sample and hold circuit storing a photogate level, and a third sample and hold circuit storing a floating diffusion level.

8. A sensor as in claim 7 further comprising a circuit which outputs a first, low sensitivity output indicative of a difference between said floating diffusion level and said reset level and a second, high sensitivity output indicative of a difference between said photogate level and said reset level.

9. A sensor as in claim 2 further comprising a controlling circuit, operating to control times of integration of said photogate and said floating diffusion, such that said floating diffusion integrates for a same time or less time than an integration time of said photogate, and such that at least part of the time of integration of said floating diffusion overlaps a time of integration of said photogate.

10. A sensor as in claim 2 wherein there are a plurality of said image processing circuits, each of which are substantially identical, each image processing circuit associated with an entire column of pixels.

11. A sensor as in claim 10 further comprising a control circuit, which produces a row select signal to each of a plurality of pixels in a single row, to provide outputs from said each of said plurality of pixels to an individual image processing circuit.

12. A method of imaging comprising:
    imaging a scene by simultaneously obtaining both a high sensitivity signal and a low sensitivity signal in each of a plurality of pixels of an image sensing device, using an integration period which is at least 80% overlapping for both high sensitivity signal and a low sensitivity signal, both said high sensitivity and low sensitivity signals being obtained within the pixel itself;
    wherein said obtaining comprises providing both a photosensor and an associated device that is associated with said photosensor which normally obtains charge from said photosensor, said photosensor obtaining the high sensitivity signal and said associated device obtaining the low sensitivity signal; and
    outputting both of said high sensitivity signal and low sensitivity signal.

13. A method as in claim 12 wherein said photosensor is a photogate and said associated device is a floating diffusion which receives charge from said photogate.

14. A method as in claim 13 further comprising:
obtaining a signal by determining a reset level of the floating diffusion;
determining an integrated value indicating the level of the floating diffusion, obtained by integrating a scene for a first specified time;
obtaining a second integrated level, obtained by integrating the scene in said photogate for a second specified time; and
outputting differences between said reset, photogate, and floating diffusion levels.

15. A method as in claim 14 wherein said first integration time of said floating diffusion is less than or equal to said second integration time of said photogate.

16. A method as in claim 14 wherein said obtaining and determining comprises first sampling said reset level, then sampling said floating diffusion level, and then transferring a photogate level to said floating diffusion level and sampling said floating diffusion level again to obtain a photogate level.

17. A photosensor device comprising:
a single continuous substrate of semiconductor material;
an image sensor portion, formed on said substrate of semiconductor material, said image sensor portion including an array of image sensor pixels, including photoreceptors, arranged in rows and columns, each of said pixels formed of an MOS electric component;
an image processing portion, also formed on said substrate, and connected to said image sensor portion such that each pixel can be selectively coupled to a specified portion of said image processing portion, said image processing portion including a plurality of transistors, each of which are formed of MOS transistors, and a plurality of which of formed of CMOS transistors, wherein said image processing portion includes a plurality of sample and hold circuits therein, including a reset sample and hold which samples a reset level, associated device sample and hold circuit which samples the level of said associated device, and a photoreceptor sample and hold which samples a level of said photoreceptor; and
a control portion, controlling integration of photoreceptors in said image sensor portion including times of said integrations, and also controlling connections between said image sensor and said image processing portion, and controlling timing of operations in said image processing portion,
each of said pixels and said image sensor including a photoreceptor, a transfer gate, and an associated portion that selectively receives charge from said photoreceptor via said transfer gate, a reset transistor, a follower transistor, coupled to said associated portion, and operating to buffer the value of said associated portion, and a selection transistor, coupled to said control portion, said control portion controlling said selection transistor to produce an output from the specified pixel such that a level of the associated portion is first sensed, and then values are coupled from said photoreceptor into said floating diffusion and to sample values on said floating diffusion, said values provided to said image processing portion.

18. A device as in claim 17 further comprising a subtraction element which subtracts said associated level from said reset level to produce the low sensitivity signal and subtracts at least one other level from said photoreceptor signal to produce a high sensitivity signal.

19. A device as in claim 17 wherein said photoreceptor includes a photogate and said associated device includes a floating diffusion associated with said photogate.

20. A device as in claim 19 wherein said image processing portion includes a plurality of sample and hold circuits, a first sample and hold circuit sampling a reset level, a floating diffusion sample and hold circuit sampling a level in the floating diffusion prior to transfer of photogate charge thereto and a photogate sample and hold circuit sampling a level on the floating diffusion after transfer of photogate charge thereto.

21. A device as in claim 20 wherein said sample and hold circuits are controlled by said control portion.

22. A device as in claim 17 wherein said image processing portion includes a plurality of image processing circuits, arranged such that one image processing circuit is associated with an entire column of said image sensor pixels, and said control circuit controls said image sensor pixels to select an entire row of image sensor pixels at one time, said entire selected row being coupled simultaneously to different ones of said image processing circuits to determine values therefrom to thereby operate to output an entire row in parallel.

23. A device as in claim 17 further comprising a reset transistor in each of said pixels.

24. A device as in claim 19 wherein said control portion controls integration times of both said photogate and said floating diffusion by controlling the reset transistor to said floating diffusion to first reset said floating diffusion, then control said select transistor to sample the level on said floating diffusion.

25. A method of obtaining images of different sensitivities, comprising:
allowing integration to occur in a floating diffusion associated with a photogate;
first sampling a level of integration which has occurred in said floating diffusion and then transferring charge from said photogate to said floating diffusion and sampling the level that has occurred in said photogate; and
outputting two values indicative respectively of a low sensitivity signal and a high sensitivity signal that were integrated at substantially the same time, based on said floating diffusion signal and said photogate signal.

26. A method as in claim 25 wherein said low sensitivity signal corresponds to said floating diffusion signal subtracted from said reset signal.

27. A method as in claim 25 wherein said high sensitivity signal corresponds to said photogate signal subtracted from said floating diffusion signal.

28. A method as in claim 25 wherein said floating diffusion is 30–40 times less sensitive to light than said photogate.

* * * * *